United States Patent
Bai et al.

(10) Patent No.: US 10,968,892 B2
(45) Date of Patent: Apr. 6, 2021

(54) CONTROLLING WIND TURBINE

(71) Applicant: Utopus Insights, Inc., Valhalla, NY (US)

(72) Inventors: Xin Xin Bai, Beijing (CN); Jin Dong, Beijing (CN); Li Li, Beijing (CN); Liang Liu, Beijing (CN); Xiao Guang Rui, Beijing (CN); Hai Feng Wang, Beijing (CN); Wen Jun Yin, Beijing (CN)

(73) Assignee: Utopus Insights, Inc., Valhalla, NY (US)

(*) Notice: Subject to any disclaimer, the term of this patent is extended or adjusted under 35 U.S.C. 154(b) by 0 days.

(21) Appl. No.: 16/573,992

(22) Filed: Sep. 17, 2019

(65) Prior Publication Data
US 2020/0080539 A1    Mar. 12, 2020

Related U.S. Application Data

(63) Continuation of application No. 15/981,760, filed on May 16, 2018, now Pat. No. 10,415,546, which is a (Continued)

(30) Foreign Application Priority Data

Feb. 28, 2013   (CN) ........................... 20130064204.7

(51) Int. Cl.
*F03D 7/04*        (2006.01)
(52) U.S. Cl.
CPC ........ *F03D 7/048* (2013.01); *F05B 2260/845* (2013.01); *Y02E 10/72* (2013.01)

(58) Field of Classification Search
CPC .. F03D 7/048; F05B 2260/845; Y02E 10/723; Y02E 10/72
See application file for complete search history.

(56) References Cited

U.S. PATENT DOCUMENTS 7,881,888 B2   2/2011   Garcia
9,989,035 B2   6/2018   Bai
(Continued)

FOREIGN PATENT DOCUMENTS

CN   101949363   1/2011
CN   102003336   4/2011
(Continued)

OTHER PUBLICATIONS

Zhang et al., Monitoring Wind Turbine Vibration Based on SCADA Data, May 2012, ASME, Journal of Solar Energy Engineering, vol. 134, 12 pp. (Year: 2012).*

(Continued)

*Primary Examiner* — Toan M Le
(74) *Attorney, Agent, or Firm* — Ahmann Kloke LLP

(57) ABSTRACT

The present invention relates to a method and apparatus for controlling a wind turbine. The method includes: dividing a plurality of wind turbines into at least one group based on a similarity in status information of the plurality of wind turbines; in response to having detected a fault in a first wind turbine of the plurality of wind turbines, searching a group to which the first wind turbine belongs for a second wind turbine matching status information of the first wind turbine; and controlling the first wind turbine based on parameters from the second wind turbine.

17 Claims, 7 Drawing Sheets

Related U.S. Application Data continuation of application No. 14/187,419, filed on Feb. 24, 2014, now Pat. No. 9,989,035.

(56) References Cited

U.S. PATENT DOCUMENTS

| | | | |
|---|---|---|---|
| 10,415,546 B2 * | 9/2019 | Bai | F03D 7/048 |
| 2003/0227172 A1 | 12/2003 | Erdman | |
| 2009/0187283 A1 | 7/2009 | Laursen | |
| 2010/0138182 A1 | 6/2010 | Jammu | |
| 2011/0313726 A1 | 12/2011 | Parthasarathy | |
| 2013/0073223 A1 | 3/2013 | Lapira | |

FOREIGN PATENT DOCUMENTS

| | | |
|---|---|---|
| CN | 102025164 | 4/2011 |
| CN | 102434392 | 5/2012 |
| EP | 1519040 | 3/2005 |
| EP | 2290597 | 3/2011 |
| EP | 2472103 | 7/2012 |
| WO | 2009068034 | 6/2009 |
| WO | 2011076295 | 6/2011 |

OTHER PUBLICATIONS

Odgaard, Peter F. et al, "Wind Turbine Fault Detection and Fault Tolerant Control—A Second Challenge," 2013 American Control Conference, Jun. 2013.

Odgaard, Peter F. et al., "Fault Tolerant Control of Wind Turbines—A Benchmark Model," Proceedings of the 7th IFAC Symposium on Fault Detection, Supervision and Safety of Technical Processes, vol. 42, No. 8, pp. 155-160, Jun. 2009.

Wang, Haifeng et al., "BP Neural Network Model Based on Cluster Analysis for Wind Power Prediction," Proceedings of 2011 IEEE International Conference on Service Operations, Logistics and Informatics, pp. 278-280, Jul. 2011.

Zhang, Zijun et al., "Monitoring Wind Turbine Vibration Based on SCADA Data," Transactions of the ASME, Journal of Solar Energy Engineering, vol. 134, May 2012.

\* cited by examiner

CONTROLLING WIND TURBINE

CROSS-REFERENCE TO RELATED APPLICATIONS

The present application is a continuation of U.S. patent application Ser. No. 15/981,760, filed May 16, 2018, issued on Sep. 17, 2019 as U.S. Pat. No. 10,415,546, and entitled "Controlling Wind Turbine", which is a continuation of U.S. patent application Ser. No. 14/187,419, filed Feb. 24, 2014, issued on Jun. 5, 2018 as U.S. Pat. No. 9,989,035, and entitled "Controlling Wind Turbine," which claims priority to Chinese Patent Application No. 201310064204.7, filed Feb. 28, 2013, which are hereby incorporated by reference herein.

BACKGROUND OF THE INVENTION

1. Field of the Invention

Various embodiments of the present invention relate to equipment control, and more specifically, to a method and apparatus for controlling a wind turbine.

2. Description of Related Art

As wind energy is clean, pollution-free and renewable, wind power plays an increasingly important role in the worldwide construction of new energy. Wind turbines are the core equipment of wind power; wind turbines are usually located in windy plains or coastal areas with bad weather conditions, so they are vulnerable to adverse factors such as the severe cold, sandstorms and moisture and are likely to crash during daily operation.

A wind turbine is a kind of large equipment for transforming wind energy into electric energy and typically includes a large number of components such as a controller, a sensor, a yaw system, a pitch system, a generator and a mechanical drive, wherein the controller and the sensor are most fault-prone. In an existing wind farm, due to the difference of the geographical location of each wind turbine and factors like surrounding topography, the controller of each wind turbine has to adjust actions (e.g., invoking a mechanical drive device to orient the wind turbine's head towards current wind direction, etc.) of each component in the wind turbine according to specific parameters of its location such as wind force, wind direction and current yaw angle of the wind turbine.

However, when the controller and/or sensor of a specific wind turbine in a wind farm has faults or crashes, in order to prevent the wind turbine from further damage, the faulted wind turbine must be shut down temporarily and wait to be maintained by technicians on the site. The shutdown of the wind turbine reduces the energy production and further produces fluctuations of power outputted to the backbone grid, and on the other hand, causes wear on the wind turbine itself and increases the workload of technicians. As a wind farm usually includes hundreds of wind turbines or more, it becomes a research focus as to how to remove the impact of faults on wind turbines immediately upon the occurrence thereof and enable wind turbines to continue work, according to the existing technical solution.

SUMMARY OF THE INVENTION

The present invention provides a method for controlling a wind turbine, including: dividing a plurality of wind turbines into at least one group based on a similarity in status information of the plurality of wind turbines; in response to having detected a fault in a first wind turbine of the plurality of wind turbines, searching a group to which the first wind turbine belongs for a second wind turbine matching status information of the first wind turbine; and controlling the first wind turbine based on parameters from the second wind turbine.

Another aspect of the present invention provides an apparatus for controlling a wind turbine, including: a dividing module configured to divide a plurality of wind turbines into at least one group based on a similarity in status information of the plurality of wind turbines; a search module configured to, in response to having detected a fault in a first wind turbine of the plurality of wind turbines, search a group to which the first wind turbine belongs for a second wind turbine matching status information of the first wind turbine; and a control module configured to control the first wind turbine based on parameters from the second wind turbine.

BRIEF DESCRIPTION OF THE SEVERAL VIEWS OF THE DRAWINGS

Through the more detailed description below in conjunction with the accompanying drawings, the features, advantages and other aspects of the embodiments of the present invention will become more apparent. Several embodiments of the present invention are illustrated here in an exemplary rather than restrictive manner.

DETAILED DESCRIPTION OF THE PREFERRED EMBODIMENTS

Figure 1:
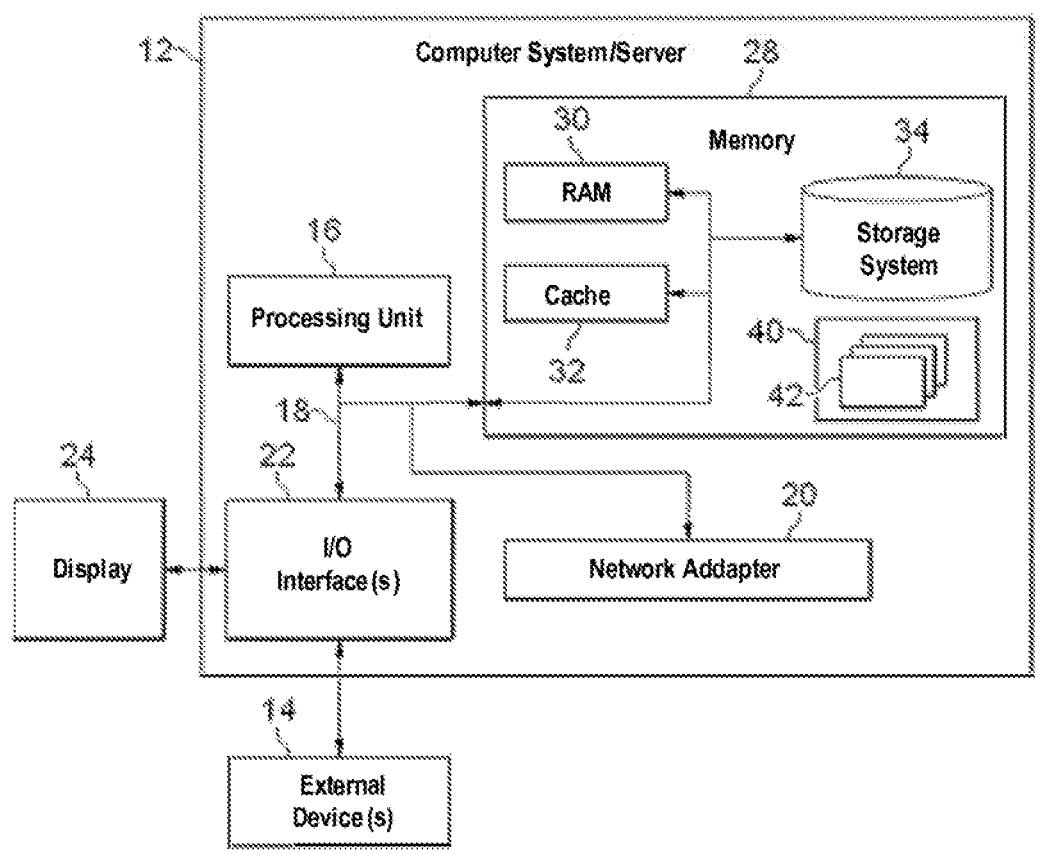
FIG. 1 schematically illustrates a block diagram of an exemplary computer system which is applicable to implement the embodiments of the present invention.

Therefore, it is desired to develop a technical solution capable of automatically controlling the operation of a wind turbine when the wind turbine has faults or crashes, and it is desired the technical solution can ensure the normal operation of the wind turbine without manual intervention of technicians. In other words, it is desired the technical solution can ensure the faulted wind turbine does not have to be shut down and can operate securely and normally during the period from the wind turbine crashing to technicians manually repairing/replacing a faulted component in the wind turbine.

According to one aspect of the present invention, there is provided a method for controlling a wind turbine, including: dividing a plurality of wind turbines into at least one group based on the similarity in status information of the plurality of wind turbines; in response to having detected a fault in a first wind turbine of the plurality of wind turbines, searching a group to which the first wind turbine belongs for a second wind turbine matching status information of the first wind turbine; and controlling the first wind turbine based on parameters from the second wind turbine.

According to one aspect of the present invention, the controlling the first wind turbine based on parameters from the second wind turbine includes: in response to a fault having occurred in a sensor of the first wind turbine, using measured values from a sensor of the second wind turbine as measured values of the sensor of the first wind turbine, for controlling the first wind turbine.

According to one aspect of the present invention, the controlling the first wind turbine based on parameters from the second wind turbine further includes: in response to a fault having occurred in a controller of the first wind turbine, adjusting the first wind turbine's head orientation and/or blade angle by a controller of the second wind turbine.

According to one aspect of the present invention, there is provided an apparatus for controlling a wind turbine. The apparatus includes: a dividing module configured to divide a plurality of wind turbines into at least one group based on the similarity in status information of the plurality of wind turbines; a search module configured to, in response to having detected a fault in a first wind turbine of the plurality of wind turbines, search a group to which the first wind turbine belongs for a second wind turbine matching status information of the first wind turbine; and a control module configured to control the first wind turbine based on parameters from the second wind turbine.

According to one aspect of the present invention, the control module includes: a first control module configured to, in response to a fault having occurred in a sensor of the first wind turbine, use measured values from a sensor of the second wind turbine as measured values of the sensor of the first wind turbine, for controlling the first wind turbine.

According to one aspect of the present invention, the control module further includes: a second control module configured to, in response to a fault having occurred in a controller of the first wind turbine, adjust the first wind turbine's head orientation and/or blade angle by a controller of the second wind turbine.

By means of the method and apparatus described by the various embodiments of the present invention, the faulted or crashed wind turbine can be controlled automatically. Therefore, the faulted wind turbine can continue to operate in security; on the other hand, technicians can reasonably arrange and schedule their work. In addition, the various embodiments of the present invention can further reduce or prevent the loss of energy production and the fluctuation of power outputted to the backbone grid, which might be caused if the faulted wind turbine shuts down.

Some preferable embodiments will be described in more detail with reference to the accompanying drawings, in which the preferable embodiments of the present invention have been illustrated. The present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

As will be appreciated by one skilled in the art, aspects of the present invention may be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated data signal can take any of a variety of forms, including, but not limited to, an electromagnetic signal, optical signal, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions can also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is illustrated. Computer system/server 12 is only illustrative and is not intended to suggest any limitation as to the scope of use or functionality of embodiments of the invention described herein.

As illustrated in FIG. 1, computer system/server 12 is illustrated in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not illustrated in FIG. 1 and typically called a "hard drive"). Although not illustrated in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Further note FIG. 1 just schematically illustrates an example of an exemplary computer system which is applicable to implement the embodiments of the present invention. Those skilled in the art should understand the computer system can be implemented by an existing computer device in a current wind turbine or implemented by introducing an additional computer device, and the present invention can be implemented by an existing computer device in a wind turbine in conjunction with a newly added additional device.

Figure 2:
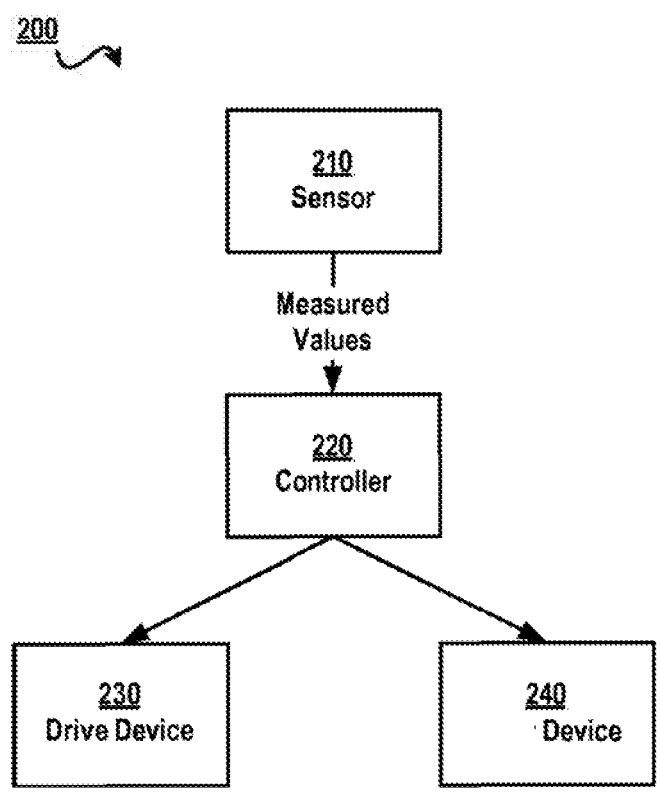
FIG. 2 schematically illustrates an architecture diagram of various components in a wind turbine according to an embodiment of the present invention.

FIG. 2 schematically illustrates an architecture diagram 200 of various components in a wind turbine according to one solution. As illustrated in FIG. 2, the wind turbine generally includes: a sensor 210 for measuring various status information (e.g., wind speed information and wind direction information of the location, as well as current yaw information of the wind turbine, etc.) of the wind turbine; a controller 220 for controlling operations of various components in the wind turbine based on various measured values from the sensor 210; a drive device 230 for driving the movement of various parts in the wind turbine (e.g., driving the wind turbine's head to change the head's orientation, driving the pitch system to change the blade angle, etc.); and other device 240 such as a generator, cabin, etc. Sensor 210 illustrated in FIG. 2 can be, for example, an aerovane for measuring wind direction and wind speed and a yaw sensor for measuring current yaw angle of the wind turbine.

Note due to the difference of the location of each wind turbine and other factors like surrounding topography, wind force and wind direction, a sensor and a controller should be configured for each wind turbine separately. In this solution, when the sensor or controller of a specific wind turbine has faults or crashes, as the status information of each wind turbine is different, control parameters from other wind turbine cannot be directly applied to the faulted wind turbine. Even if two wind turbines are geographically close to each other, their control parameters might differ considerably. If parameters from a wind turbine operating normally are applied to a faulted wind turbine straightforwardly, wind power resources cannot be put to effective use, and at worst adverse consequences might arise, such as damage to wind turbines and harm to the electric field security.

Figure 3:
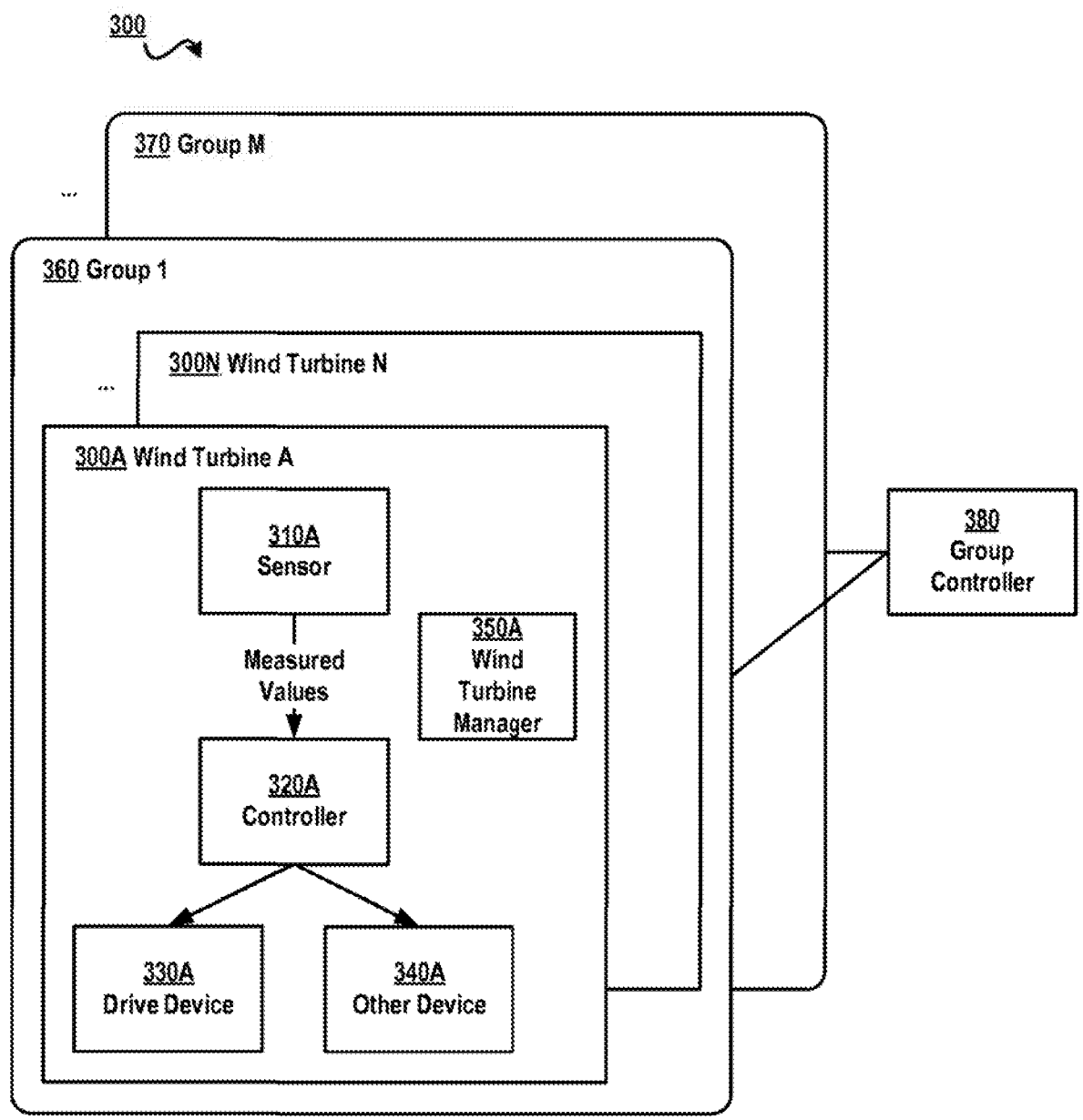
FIG. 3 schematically illustrates an architecture diagram of a system for controlling a wind turbine according to one embodiment of the present invention.

In view of the foregoing drawbacks, the various embodiments of the present invention propose a technical solution for using parameters from a normal wind turbine, which is similar to the status of a faulted wind turbine, to control the faulted wind turbine by analyzing the similarity in wind turbine status. FIG. 3 schematically illustrates an architecture diagram 300 of a system for controlling a wind turbine according to one embodiment of the present invention.

FIG. 3 schematically illustrates a schematic view of a plurality of wind turbines (e.g., a wind turbine A 300A, . . . , a wind turbine N 300N) in a wind farm, wherein based on the similarity in status information of the plurality of wind turbines, the plurality of wind turbines can be divided into at least one group (e.g., a group 1 360, . . . , a group M 370), each group including one or more wind turbines. For example, group 1 360 can include wind turbine A 300A, . . . , wind turbine N 300N. In addition, a group controller 380 can be disposed in the wind farm, for grouping the plurality of wind turbines based on the similarity in status information of the wind turbines and managing each group and each wind turbine. Each wind turbine can have components similar to those illustrated with reference to FIG. 2 above; for example, wind turbine A 300A can include a sensor 310A, a controller 320A, a drive device 330A and other device 340A. In addition, the wind turbine A 300A can further include a wind turbine manager 350A for implementing wired/wireless data communication between group manager 380A and the plurality of wind turbines and controlling a wind turbine in response to data from group manager 380, etc. Note in the context of the present invention, wind turbine manager 350A can operate in a mode different to an existing wind turbine system, e.g., can implement communication between a plurality of devices based on wireless ad hoc network technology.

Like wind turbine A 300A, wind turbine N 300N can also include similar components. In addition, although only details of group 1 360 are illustrated in FIG. 3, those skilled in the art can understand other group (e.g., group M 370) can also include one or more wind turbines.

Based on the architecture as illustrated in FIG. 3, when a wind turbine (e.g., wind turbine A 300A in group 1 360) in a group has faults or crashes, parameters from another wind turbine (e.g., wind turbine N 300N in group 1 360) in this group can be used for controlling the operation of wind turbine A 300A. As status information of wind turbines in a group is similar, operating a faulted wind turbine with parameters from a normal wind turbine in the same group will not lead to such risks as parameter mismatch, or shut down the faulted wind turbine and wait for it to be maintained by technicians. Note in the embodiments of the present invention, parameters from a normal wind turbine can be used directly to control a faulted wind turbine, or based on the similarity between the faulted wind turbine and an existing wind turbine, parameters from a normal wind turbine can be processed so as to control the faulted wind turbine by using processed parameters that are more suitable to conditions of the faulted wind turbine.

Specifically, the present invention provides a method for controlling a wind turbine, including: dividing a plurality of wind turbines into at least one group based on a similarity in status information of the plurality of wind turbines; in response to having detected a fault in a first wind turbine of the plurality of wind turbines, searching a group to which the first wind turbine belongs for a second wind turbine matching status information of the first wind turbine; and controlling the first wind turbine based on parameters from the second wind turbine.

Figure 4:
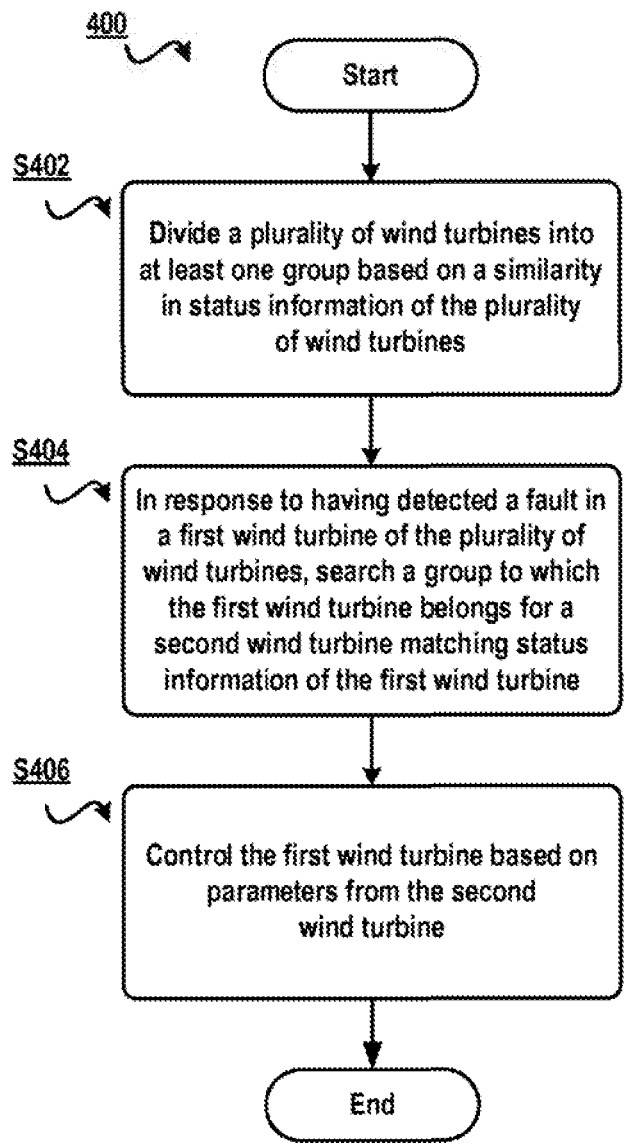
FIG. 4 schematically illustrates a flowchart of a method for controlling a wind turbine according to one embodiment of the present invention.

FIG. 4 schematically illustrates a flowchart of a method for controlling a wind turbine according to one embodiment of the present invention. As illustrated in FIG. 4, first of all, in step S402 a plurality of wind turbines are divided into at least one group based on the similarity in status information of the plurality of wind turbines. Those skilled in the art should note since wind direction information is one of the most significant factors in controlling the operation of a wind turbine, the similarity in wind direction information at various wind turbines can be taken into consideration first. In one embodiment of the present invention, if wind direction is represented with an interval [0°, 360°), then the plurality of wind turbines can be divided into a plurality of groups every specific angle (e.g., 3°); for example, wind turbines with wind direction of [0°-3°) are grouped into a first group, and wind turbines with wind direction of [3°-6°) are grouped into a second group. Note in this embodiment the angle interval is merely illustrative, and those skilled in the art can further set the interval to a larger or smaller value.

In one embodiment of the present invention, to consider impacts of various factors like topography and meteorology on wind turbines, one or more of the following factors can be taken into consideration: location information, wind speed information, wind direction information, and yaw information. Specifically, those skilled in the art can apply different weights to different factors and further calculate the similarity in status information of wind turbines, which will be described in detail below.

In step S404, in response to having detected a fault in a first wind turbine of the plurality of wind turbines, a group to which the first wind turbine belongs is searched for a second wind turbine matching status information of the first wind turbine. Note when wind turbines are in normal operating state, each wind turbine can control its operation by its controller based on measured values collected by its sensor. However, when a fault occurs in a wind turbine (e.g., a sensor fault and/or a controller fault), a normal wind turbine that is most similar to the faulted wind turbine status is looked for in a group to which the faulted wind turbine belongs, and subsequently the faulted wind turbine is controlled based on parameters from the normal wind turbine.

Those skilled in the art can understand status information of each wind turbine in a group to which the faulted wind turbine belongs is similar in some degree to status information of the faulted wind turbine. To control the similarity degree between various wind turbines, a similarity threshold may be defined while grouping. In case of a high threshold, there perhaps exists some difference in status information of various wind turbines in a group; in case of a low threshold, it is considered such difference is quite slight and even can be ignored.

Therefore, "matching" can be construed as having the highest similarity, or where a threshold is well defined during grouping, it can be considered every two wind turbines in a group are matching. Alternatively, to simplify calculation, further it can be considered two wind turbines that are most geographically adjacent are "matching," or it can be considered two wind turbines that are closest in wind direction are "matching," or each factor in status information may be considered to look for the most matching wind turbine.

In step S406, the first wind turbine is controlled based on parameters from the second wind turbine. Those skilled in the art should understand wind turbines are complicated, precision, large equipment capable of transforming wind energy into electric energy, so controlling a wind turbine can involve control of the wind turbine's various components like a hydraulic system, bearings and a gearbox, in order to drive operations such as adjusting the wind turbine's head orientation and/or blade angle. In the context of the present invention, no detailed description is presented regarding how to drive these mechanical and/or electronic devices, and those skilled in the art can design by themselves a specific implementation based on the prior art, so long as operations of various components in the wind turbine can be controlled.

Note an important basis for ensuring normal operation of a wind turbine is to correctly arrange the wind turbine's head orientation and blade angle. Therefore, in the embodiments of the present invention, adjusting a wind turbine's head orientation and blade angle is taken as a specific example of controlling the wind turbine. Those skilled in the art can implement the control of other components in the wind turbine based on the principles illustrated in the context of the present invention.

In one embodiment of the present invention, the sensor including at least one of an aerovane and a yaw sensor. Statistics illustrate that the sensor and the controller are the most fault-prone components in the wind turbine. Thus, how to control a faulted wind turbine by using parameters from a normal wind turbine can be considered in sensor fault and controller fault respects.

In one embodiment of the present invention, the controlling the first wind turbine based on parameters from the second wind turbine includes: in response to a fault having occurred in a sensor of the first wind turbine, using measured values from a sensor of the second wind turbine as measured values of the sensor of the first wind turbine, for controlling the first wind turbine.

Hereinafter, details of how to control a faulted wind turbine are illustrated by taking an aerovane and a yaw sensor as specific examples of sensors. The aerovane can be used for measuring current wind force and direction of the location of a wind turbine; a controller of a wind turbine can control the wind turbine to be oriented towards the direction where the wind blows, based on current wind force magnitude and whether current wind direction coincides with yaw angle of the current wind turbine, so as to make the most effective use of wind power resources. When an aerovane of a first wind turbine (e.g., a faulted wind turbine) has faults or crashes, actual measured values of wind force and wind direction at the first wind turbine cannot be obtained; at this point, wind force and wind direction at a second wind turbine that are measured by an aerovane of the second wind turbine (e.g., a normal wind turbine) in a group to which the first wind turbine belongs can be obtained. By using measured values (e.g., wind force and wind direction) from a sensor of the second wind turbine as measured values of a sensor of the first wind turbine, a basis is thus provided for controlling the first wind turbine.

In one embodiment of the present invention, a yaw sensor can measure yaw angle (e.g., represented by the wind turbine's head orientation) of a wind turbine. When a yaw sensor of the first wind turbine has faults or crashes, yaw angle of the wind turbine cannot be obtained internally from the first wind turbine; at this point, yaw angle of the second wind turbine that is measured by a yaw sensor of the second wind turbine in a group to which the first wind turbine belongs can be obtained and is used as yaw angle of the first wind turbine on which the control of the first wind turbine is based.

In one embodiment of the present invention, the using measured values from a sensor of the second wind turbine as measured values of the sensor of the first wind turbine for controlling the first wind turbine includes: obtaining wind information and yaw angle of the first wind turbine from the measured values from the sensor of the second wind turbine; and adjusting the first wind turbine's head orientation and/or blade angle based on the yaw angle and the wind information.

Figure 5A:
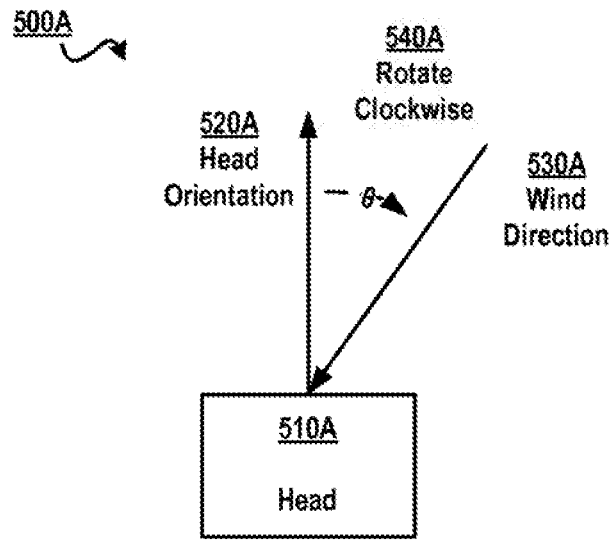
FIGS. 5A and 5B schematically illustrate schematic views of the process for controlling the orientation of a wind turbine head according to the embodiments of the present invention.
Figure 5B:
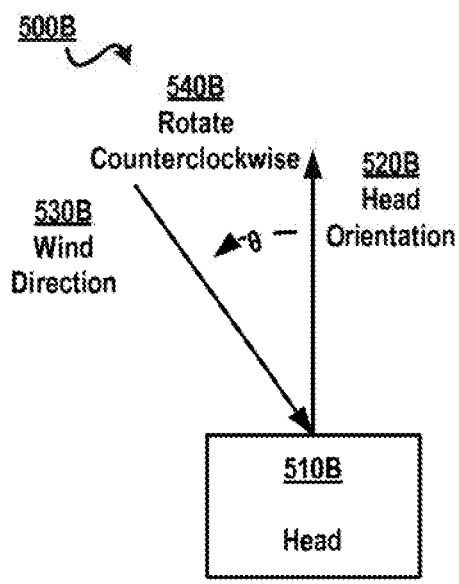

Hereinafter, detailed description is presented to how to adjust the first wind turbine's head orientation and/or blade angle based on the yaw angle and the wind information. With reference to FIGS. 5A and 5B, these figures schematically illustrate schematic views 500A and 500B of the process for controlling the orientation of a wind turbine head according to embodiments of the present invention, respectively. As illustrated in FIG. 5A, the orientation (coinciding with the yaw angle) of a wind turbine head 510A is as illustrated by an arrow 520A, and the wind direction is as illustrated by an arrow 530A. At this point, to cause the head orientation to coincide with wind direction 530A, the head can rotate clockwise by an offset $\theta$, wherein $\theta$ can be calculated based on a difference between current head orientation 520A and wind direction 530A. Note head orientation 520A and wind direction 530A can be represented using the same or different coordinate systems, and those skilled in the art can solve a value of the offset $\theta$ based on the coordinate transformation principle, which is not detailed here. Like FIG. 5A, FIG. 5B illustrates the circumstance where the wind direction is as illustrated by an arrow 530B, at which point the head should rotate counterclockwise by the offset $\theta$.

In one embodiment, the dividing a plurality of wind turbines into at least one group based on the similarity in status information of the plurality of wind turbines includes: collecting status information of the plurality of wind turbines; building a similarity matrix based on the status information; dividing the plurality of wind turbines into at least one group by solving eigenvalues of the matrix.

How to divide a plurality of wind turbines into at least one group based on the similarity in status information of the plurality of wind turbines will be described below by way of example. Suppose a wind farm includes only three wind turbines, namely A, B and C. Specifically, in this example consideration is given to each wind turbine's location information, wind speed information, wind direction information and yaw information, wherein for a specific wind turbine, location information can be presented as (x,y);

historical wind speed information can be represented as $(v1, v2, \ldots, vn)$;

historical wind direction information can be represented as $(d1, d2, \ldots, dn)$; and historical yaw information can be represented as (y1, y2, . . . , yn).

While calculating the similarity, the similarity in the above four respects are respectively calculated with the following equations.

1. Location Similarity:

$$Sp(A,B)=1-\sqrt{avg(PA-PB)^2}/maxDistance \quad \text{Equation (1)}$$

Wherein "maxDistance" is the maximum distance between respective wind turbines.

2. Wind Speed Similarity:

$$Sv(A,B)=1-\sqrt{avg(VA-VB)^2}/maxSpeed \quad \text{Equation (2)}$$

Wherein "maxSpeed" is the maximum wind speed in the wind farm.

3. Wind Direction Similarity:

$$Sd(A,B)=1-\sqrt{avg(DA-DB)^2}/360 \quad \text{Equation (3)}$$

4. Yaw Similarity:

Based on the method that has been illustrated above with reference to FIGS. 5A and 5B, the following can be calculated: 1) a future yaw value TA' of a wind turbine A (simulating the aerovane fault situation of wind turbine A), based on given historical yaw TA of wind turbine A and historical wind direction of a wind turbine B; and 2) a future yaw value TA" of wind turbine A (simulating the yaw sensor fault situation of wind turbine A), based on given historical yaw TA of wind turbine B and historical wind direction of wind turbine A, wherein $$St(A,B)=S(TA,TA',TA''), \text{ and } St(B,A)=S(TB,TB',TB''). \quad \text{Equation (4)}$$

By setting weights with respect to the above four status factors, the similarity between any two wind turbines A and B can be obtained:

$$S(A,B)=\alpha Sp(A,B)+\beta Sv(A,B)+\gamma Sd(A,B)+\varphi St(A,B),$$
$$\text{wherein } \alpha+\beta+\gamma+\varphi=1 \text{ and } \alpha,\beta,\gamma,\varphi>1. \quad \text{Equation (5)}$$

In addition, as a specific wind turbine is completely similar to itself, $S(A,A)=S(B,B)=S(C,C)=1$. By Equations (1)-(5), a similarity matrix describing the similarity in three wind turbines A, B and C in the wind farm can be obtained:

$$W = \begin{bmatrix} W(A,A) & S(A,B) & S(A,C) \\ S(B,A) & S(B,B) & S(B,C) \\ S(C,A) & S(C,B) & S(C,C) \end{bmatrix}$$

Suppose a similarity matrix is $$W = \begin{bmatrix} 1 & 0.6 & 0.7 \\ 0.5 & 1 & 0.7 \\ 0.7 & 0.8 & 1 \end{bmatrix},$$

and a diagonal matrix is $$D = \begin{bmatrix} 2.3 & 0 & 0 \\ 0 & 2.2 & 0 \\ 0 & 0 & 2.5 \end{bmatrix},$$

then $$D - W = \begin{bmatrix} 1.3 & -0.6 & -0.7 \\ -0.5 & 1.2 & -07 \\ -0.7 & -0.8 & 1.5 \end{bmatrix},$$

at which point eigenvalues of D-W are (0, 1.8, 2.2), and eigenvectors corresponding to second minimum eigenvalues are (-45.5, 29, 8).

According to symbols of the eigenvectors, A, B and C can be divided into two groups: the first group={A} (corresponding to values <0); and the second group={B, C} (corresponding to values >0).

In the above-described embodiment, the diagonal matrix D can be built based on the sum of elements in rows in the matrix W. For example, where the matrix W involves an n number of wind turbines, the diagonal matrix can be calculated based on the equation below.

$$D = \begin{bmatrix} d_{0,0} & & & \\ & \ldots & & \\ & & d_{i,j} & \\ & & & \ldots \\ & & & & d_{n,n} \end{bmatrix} \quad \text{Equation (6)}$$

Where for $0 \leq i$ and $j \leq n$, $$d_{i,j} = \Sigma_{j=0}^{n} s_{i,j}, \text{ and } s_{i,j}$$

is the value of an element at (i, j) in the matrix W.

Nevertheless illustrated above is the situation where eigenvectors are solved for the matrix W-D and further the wind turbines are grouped, those skilled in the art can use other specific grouping equations or approaches based on the similarity principles.

In one embodiment of the present invention, the searching a group to which the first wind turbine belongs for a second wind turbine matching status information of the first wind turbine includes: looking up a wind turbine having the highest similarity with the first wind turbine in a similarity matrix; and identifying the wind turbine as the second wind turbine.

Specifically, a wind turbine having the highest similarity with the faulted wind turbine can be looked up in the above-described similarity matrix W and taken as the second wind turbine. For example, when wind turbine A has faults, the lookup can be implemented based on values of elements S (A, B) and S (A, C) in the matrix W.

Alternatively, for simplification purposes, a wind turbine that is closest to wind direction at the faulted wind turbine can be used as the second wind turbine, or a wind turbine that is closest to the geographical location of the faulted wind turbine can be used as the second wind turbine. Alternatively, a typical wind turbine in a group that is most representative of wind turbine status in the group can be used as a representative such that parameters from the typical wind turbine are used directly when any wind turbine in the group has faults or crashes; when the typical wind turbine has faults or crashes, however, other wind turbine can be selected based on the method described above.

In one embodiment of the present invention, the controlling the first wind turbine based on parameters from the second wind turbine further includes: in response to a fault having occurred in a controller of the first wind turbine, adjusting the first wind turbine's head orientation and/or blade angle by a controller of the second wind turbine.

As detailed description has been presented regarding how to control a faulted wind turbine by using parameters from a normal wind turbine when the wind turbine's sensor has faults or crashes, description is presented below to how to deal when a controller of a wind turbine has faults or crashes. Note when a controller of a wind turbine has faults or crashes, the controller cannot calculate how to adjust the faulted wind turbine's head orientation and/or blade angle based on the wind turbine's yaw angle, wind direction and wind speed as described above. At this point, a controller of a normal wind turbine can be used to perform the above operations.

For example, current yaw angle of the faulted wind turbine and wind direction and wind speed at the faulted wind turbine can be sent from the faulted wind turbine to the normal wind turbine, and next the controller of the normal wind turbine can obtain correct control parameters based on the received data. At this point, the faulted wind turbine's head orientation and/or blade angle can be adjusted by directly controlling a drive device of the first wind turbine based on the above control parameters by the normal wind turbine. Those skilled in the art can understand the above operations can be performed using any normal wind turbine in the wind farm or any other computing device that is capable of controlling a wind turbine to operate.

In one embodiment of the present invention, the adjusting the first wind turbine's head orientation and/or blade angle by a controller of the second wind turbine includes: calculating offsets of the first wind turbine's head orientation and/or blade angle by the controller of the second wind turbine based on the measured values of the sensor of the first wind turbine; and changing the first wind turbine's head orientation and/or blade angle based on the offsets. Specifically, first of all the controller of the normal wind turbine obtains offsets of various components of the faulted wind turbine, and then these offsets are directly applied to the drive device of the faulted wind turbine, thereby changing the faulted wind turbine's head orientation and/or blade angle.

In one embodiment of the present invention, the dividing a plurality of wind turbines into at least one group based on a similarity in status information of the plurality of wind turbines is implemented in response to any one of the following conditions: a timeout of a predetermined time interval arrives; the similarity in status information of wind turbines in an existing group no longer meets a predetermined threshold; and no other wind turbine exists in the group to which the first wind turbine belongs.

Figure 6:
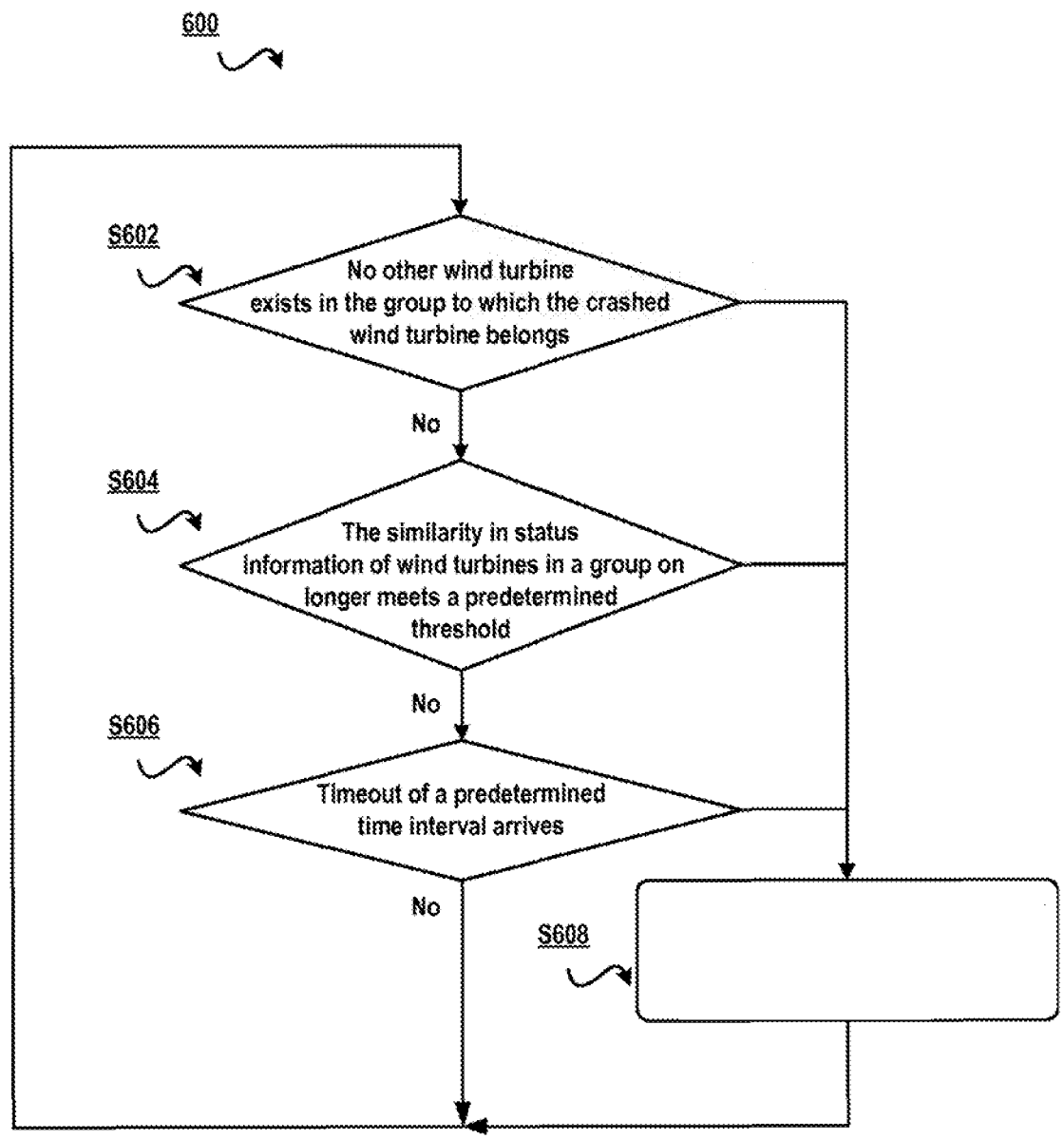
FIG. 6 schematically illustrates a flowchart of a method for dividing wind turbines into groups according to one embodiment of the present invention.

Specifically, FIG. 6 schematically illustrates a flowchart 600 of a method for dividing wind turbines into groups according to one embodiment of the present invention. As illustrated in FIG. 6, the grouping can be implemented periodically. For example, in step S602, in response to no other wind turbine existing in the group to which the first wind turbine belongs, the workflow proceeds to grouping step S608. Note in the embodiments of the present invention, since a normal wind turbine that is similar to the status of the faulted wind turbine needs to be sought and the faulted wind turbine is controlled based on parameters from the normal wind turbine, when no other wind turbine exists in the group to which the faulted wind turbine belongs, it indicates that no normal qualified wind turbine is found, and thus grouping step S608 should be executed again for finding a matching wind turbine. If still no matching wind turbine is found after grouping step S608 is executed once again, then one can have the faulted wind turbine shut down and wait to be maintained by technicians.

In step S604, in response to the similarity in status information of wind turbines in one of the at least one group no longer meeting a predetermined threshold, the workflow proceeds to grouping step S608. When the similarity in status information of one or more wind turbines in any group no longer meets the predetermined threshold, it can be considered status information of various wind turbines in this group are no longer similar to each other, at which point these wind turbines cannot share control parameters any more and thus grouping step S608 should be executed again.

In step S606, in response to timeout of predetermined time intervals (e.g., implemented by setting a timer), the workflow proceeds to grouping step S608. Since meteorological factors at a wind turbine change slowly and topographic factors change more slowly, intervals of the timer can be set to an order of magnitude like 1 hour. Further, those skilled in the art can define by themselves time intervals of the timer according to specific situation of the wind farm.

Although FIG. 6 illustrates various judgment steps in the order of S602, S604 and S608, those skilled in the art can understand these judgment steps can be executed in parallel/series or in other order.

In one embodiment of the present invention, the status information includes at least one of location information, wind speed information, wind direction information and yaw information. Those skilled in the art can understand the status information can include one or more of these respects; based on the method for defining similarity as illustrated with reference to Equations (1)-(5), those skilled in the art can increase or decrease the kind and amount of the status information or combine them.

Figure 7:
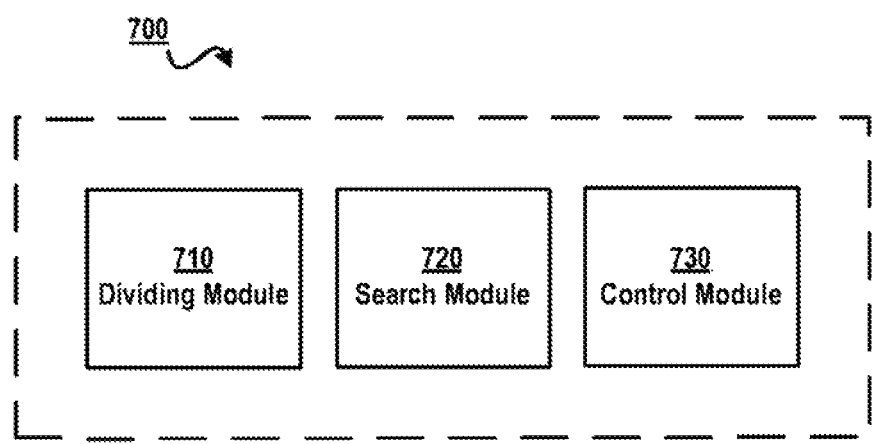
FIG. 7 schematically illustrates a block diagram of an apparatus for controlling a wind turbine according to one embodiment of the present invention.

FIG. 7 schematically illustrates a block diagram 700 of an apparatus for controlling a wind turbine according to one embodiment of the present invention. Specifically, the apparatus for controlling a wind turbine illustrated in FIG. 7 includes: a dividing module 710 configured to divide a plurality of wind turbines into at least one group based on a similarity in status information of the plurality of wind turbines; a search module 720 configured to, in response to having detected a fault in a first wind turbine of the plurality of wind turbines, search a group to which the first wind turbine belongs for a second wind turbine matching status information of the first wind turbine; and a control module 730 configured to control the first wind turbine based on parameters from the second wind turbine.

In one embodiment of the present invention, control module 730 includes: a first control module configured to, in response to a fault having occurred in a sensor of the first wind turbine, use measured values from a sensor of the second wind turbine as measured values of the sensor of the first wind turbine, for controlling the first wind turbine.

In one embodiment of the present invention, the first control module includes: an obtaining module configured to obtain wind information and yaw angle of the first wind turbine from the measured values from the sensor of the second wind turbine; and an adjusting module configured to adjust the first wind turbine's head orientation and/or blade angle based on the yaw angle and the wind information.

In one embodiment, dividing module 710 includes: a collecting module configured to collect status information of the plurality of wind turbines; a building module configured to build a similarity matrix based on the status information; and a grouping module configured to divide the plurality of wind turbines into at least one group by solving eigenvalues of the matrix.

In one embodiment of the present invention, search module 720 includes: a lookup module configured to look up a wind turbine having the highest similarity with the first wind turbine in a similarity matrix; and an identifying module configured to identify the wind turbine as the second wind turbine.

In one embodiment of the present invention, control module 730 further includes: a second control module configured to, in response to a fault having occurred in a controller of the first wind turbine, adjust the first wind turbine's head orientation and/or blade angle by a controller of the second wind turbine.

In one embodiment of the present invention, the second control module includes: a calculation module configured to calculate offsets of the first wind turbine's head orientation and/or blade angle by the controller of the second wind turbine based on the measured values of the sensor of the first wind turbine; and a change module configured to change the first wind turbine's head orientation and/or blade angle based on the offsets.

In one embodiment of the present invention, the sensor includes at least one of aerovane and a yaw sensor.

In one embodiment of the present invention, the apparatus for controlling a wind turbine further includes: an invoking module (not illustrated) configured to invoke the dividing module in response to any one of the following conditions: a timeout of a predetermined time interval arrives; the similarity in status information of wind turbines in an existing group no longer meets a predetermined threshold; and no other wind turbine exists in the group to which the first wind turbine belongs.

In one embodiment of the present invention, the status information includes at least one of location information, wind speed information, wind direction information and yaw information.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks illustrated in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus, comprising:
a processor; and
a memory storing instructions that, when executed by the processor, cause the apparatus to perform a method comprising:
receiving first status information regarding each of a plurality of wind turbines at a first time, the first status information for each of the plurality of wind turbines including status components, the status components including at least wind information and yaw information;
for each wind turbine of the plurality of wind turbines, determining a first difference between yaw information of the first status information of that particular wind turbine and each yaw information of the first status information of every other wind turbine of the plurality of wind turbines;
for each wind turbine of the plurality of wind turbines, comparing the first differences between at least the yaw information of that particular wind turbine and at least the yaw information of every other wind turbine of the plurality of wind turbines to at least one status component threshold;
dividing the plurality of wind turbines into two or more groups based on the first differences with the at least one status component threshold;
detecting a fault in the first wind turbine of the plurality of wind turbines at a second time, identifying a first group to which the first wind turbine belongs, the first group being one of the two or more groups; and
identifying a second wind turbine within the first group of the two or more groups, and controlling operation of the first wind turbine based on at least one parameter from the second wind turbine, if no other wind turbines of the plurality of wind turbines belongs to the first group of two or more groups to which the first wind turbine belongs and in response to one of a plurality of trigger conditions then:
receiving second status information regarding each of the plurality of wind turbines at a second time, the second status information for each of the plurality of wind turbines including status components for each wind turbine of the plurality of wind turbines;
for each wind turbine of the plurality of wind turbines, determining a second difference between at least the wind information of that particular wind turbine and each wind information of the second status information of every other wind turbine of the plurality of wind turbines;
for each wind turbine of the plurality of wind turbines, comparing the second differences between at least the wind information of that particular wind turbine and at least the wind information of every other wind turbine of the plurality of wind turbines to at least one status component threshold; and
re-dividing the plurality of wind turbines into two or more groups based on the second differences with the at least one status component threshold; and
identifying a second wind turbine within the group containing the wind turbine with the fault, and controlling operation of the first wind turbine based on at least one parameter from the second wind turbine, and if no other wind turbines of the plurality of wind turbines belongs to the group of two or more groups to which the first wind turbine belongs, then shut down the first wind turbine.

2. The apparatus of claim 1 wherein the second time corresponds to a time of the response to one of the plurality of trigger conditions.

3. The apparatus of claim 1, wherein the trigger conditions include a predetermined time interval having passed or a change in meteorological factors affecting at least some of the plurality of wind turbines.

4. The apparatus of claim 3, wherein the change in meteorological factors is greater than a trigger threshold.

5. The apparatus of claim 4, wherein the meteorological factors including wind speed and wind direction.

6. The apparatus of claim 3, wherein the predetermined time interval is greater than a time threshold.

7. The apparatus of claim 1, wherein the controlling operation of the first wind turbine based on the at least one parameter from the second wind turbine comprises:

using second measured values from a second sensor of the second wind turbine as first measured values of a first sensor of the first wind turbine for the controlling the operation of the first wind turbine.

8. The apparatus of claim 7, wherein using the second measured values from the second sensor of the second wind turbine as the first measured values of the first sensor of the first wind turbine for the controlling the first wind turbine comprises:

obtaining the at least one parameter comprising wind information and a yaw angle from the second sensor of the second wind turbine; and adjusting at least one other parameter of the first wind turbine based on the yaw angle and the wind information of the second wind turbine, wherein the at least one other parameter is selected from a set comprising of: a head orientation and a blade angle.

9. A computer implemented method, the method comprising:

receiving first status information regarding each of a plurality of wind turbines at a first time, the first status information for each of the plurality of wind turbines including status components, the status components including at least wind information and yaw information;

for each wind turbine of the plurality of wind turbines, determining a first difference between yaw information of the first status information of that particular wind turbine and each yaw information of the first status information of every other wind turbine of the plurality of wind turbines;

for each wind turbine of the plurality of wind turbines, comparing the first differences between at least the yaw information of that particular wind turbine and at least the yaw information of every other wind turbine of the plurality of wind turbines to at least one status component threshold;

dividing the plurality of wind turbines into two or more groups based on the first differences with the at least one status component threshold;

detecting a fault in the first wind turbine of the plurality of wind turbines at a second time, identifying a first group to which the first wind turbine belongs, the first group being one of the two or more groups; and identifying a second wind turbine within the first group of the two or more groups, and controlling operation of the first wind turbine based on at least one parameter from the second wind turbine, if no other wind turbines of the plurality of wind turbines belongs to the first group of two or more groups to which the first wind turbine belongs and in response to one of a plurality of trigger conditions then:

receiving second status information regarding each of the plurality of wind turbines at a second time, the second status information for each of the plurality of wind turbines including status components for each wind turbine of the plurality of wind turbines;

for each wind turbine of the plurality of wind turbines, determining a second difference between at least the wind information of that particular wind turbine and each wind information of the second status information of every other wind turbine of the plurality of wind turbines;

for each wind turbine of the plurality of wind turbines, comparing the second differences between at least the wind information of that particular wind turbine and at least the wind information of every other wind turbine of the plurality of wind turbines to at least one status component threshold; and re-dividing the plurality of wind turbines into two or more groups based on the second differences with the at least one status component threshold; and identifying a second wind turbine within the group containing the wind turbine with the fault, and controlling operation of the first wind turbine based on at least one parameter from the second wind turbine, and if no other wind turbines of the plurality of wind turbines belongs to the group of two or more groups to which the first wind turbine belongs, then shut down the first wind turbine.

10. The computer implemented method of claim 9, wherein the trigger conditions include a predetermined time interval having passed or a change in meteorological factors affecting at least some of the plurality of wind turbines.

11. The computer implemented method of claim 9, to a time of the response to one of the plurality of trigger conditions.

12. The computer implemented method of claim 9, wherein the trigger conditions include a predetermined time interval having passed or a change in meteorological factors affecting at least some of the plurality of wind turbines.

13. The computer implemented method of claim 12, wherein the change in meteorological factors is greater than a trigger threshold.

14. The computer implemented method of claim 13, wherein the meteorological factors including wind speed and wind direction.

15. The computer implemented method of claim 12, wherein the predetermined time interval is greater than a time threshold.

16. The computer implemented method of claim 9, wherein the controlling operation of the first wind turbine based on the at least one parameter from the second wind turbine comprises:

using second measured values from a second sensor of the second wind turbine as first measured values of a first sensor of the first wind turbine for the controlling the operation of the first wind turbine.

17. The computer implemented method of claim 9, wherein using the second measured values from the second sensor of the second wind turbine as the first measured values of the first sensor of the first wind turbine for the controlling the first wind turbine comprises:

obtaining the at least one parameter comprising wind information and a yaw angle from the second sensor of the second wind turbine; and adjusting at least one other parameter of the first wind turbine based on the yaw angle and the wind information of the second wind turbine, wherein the at least one other parameter is selected from a set comprising of: a head orientation and a blade angle.

\* \* \* \* \*